United States Patent
Kato et al.

(10) Patent No.: US 6,236,011 B1
(45) Date of Patent: May 22, 2001

(54) METHOD AND APPARATUS FOR DETECTING AN ABNORMAL LOAD ON A SERVO GUN SHAFT

(75) Inventors: Tetsuaki Kato, Hadano; Soichi Arita, Oshino-mura, both of (JP)

(73) Assignee: Fanau Ltd., Yamanashi (JP)

( * ) Notice: Subject to any disclaimer, the term of this patent is extended or adjusted under 35 U.S.C. 154(b) by 0 days.

(21) Appl. No.: 09/284,388

(22) PCT Filed: Aug. 13, 1998

(86) PCT No.: PCT/JP98/03617

§ 371 Date: Apr. 13, 1999

§ 102(e) Date: Apr. 13, 1999

(87) PCT Pub. No.: WO99/08826

PCT Pub. Date: Feb. 25, 1999

(30) Foreign Application Priority Data

Aug. 13, 1997 (JP) .................................................. 9-231760

(51) Int. Cl.$^7$ .................................................. B23K 11/25
(52) U.S. Cl. .................................. 219/86.41; 219/91.1
(58) Field of Search ............................. 219/86.41, 86.51, 219/86.7, 91.1

(56) References Cited

U.S. PATENT DOCUMENTS

| | | | |
|---|---|---|---|
| 5,340,960 | * | 8/1994 | Takasaki et al. .................. 219/86.7 |
| 5,405,075 | * | 4/1995 | Narita .................................. 219/91.1 |
| 5,510,593 | * | 4/1996 | Sakai .................................. 219/91.2 |
| 5,582,747 | * | 12/1996 | Sakai et al. ...................... 219/86.41 |
| 5,883,355 | * | 3/1999 | Kaneshima ...................... 219/86.51 |

FOREIGN PATENT DOCUMENTS

07080656    3/1995    (JP) .

* cited by examiner

Primary Examiner—Clifford C. Shaw
(74) Attorney, Agent, or Firm—Staas & Halsey LLP (57) ABSTRACT

A method of and apparatus for detecting an abnormal load on a servo gun axis, capable of quickly detecting sticking of a welding tip to an object of welding before movement of a robot, without adversely affecting the object. A load applied to a servomotor for driving a welding tip of a welding gun is detected by an observer. An abnormal load signal is output when the estimated disturbance load deviates from a range defined by a reference $\beta$ ($\beta > 0$). A determination as to whether or not the estimated disturbance load is larger than the reference value $+\beta$ is not made during a period of time from the start of a closing motion of the welding gun until the estimated disturbance load becomes smaller than a set value $\alpha$. When the welding tip is stuck to a workpiece, a negative estimated disturbance load smaller than $-\beta$ is derived and an abnormal load Signal is outputted.

4 Claims, 4 Drawing Sheets

FIG. 3a
VELOCITY OF SERVO
GUN AXIS MOTOR

FIG. 3b
DISTURBANCE ON
SERVO GUN AXIS

FIG. 3c
WELDING START SIGNAL

METHOD AND APPARATUS FOR DETECTING AN ABNORMAL LOAD ON A SERVO GUN SHAFT

BACKGROUND OF THE INVENTION

1. Field of the Invention

The present invention relates to a servo welding gun mounted on a robot and having a welding tip driven by a servomotor, and more particularly to a method of and apparatus for detecting an abnormal load exerted on a servo gun axis on which the welding tip is provided.

2. Description of Related Art

Figure 5A:
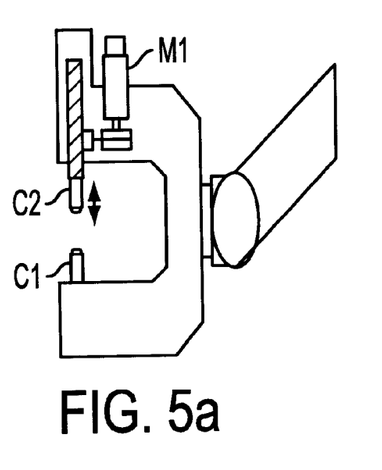
FIGS. 5A—5B illustrate servo guns having a welding tip driven by a servomotor.
Figure 5B:
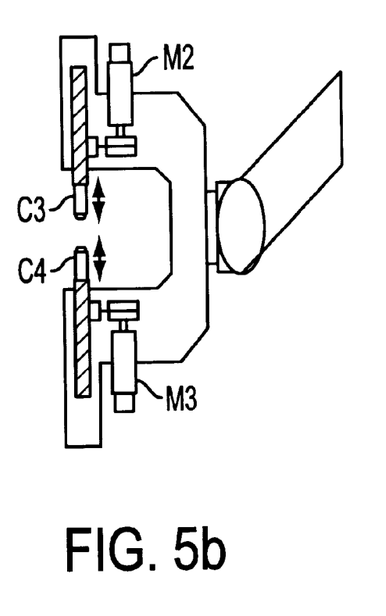

In robotized spot welding systems, servo welding guns driven by servomotors have come to be used because of their merits such as high welding quality and short cycle time. There are two types of the servo guns as shown in FIGS. 5a and 5b, and in a single axis type servo gun shown in FIG. 5a, a fixed welding tip C1 and a movable welding tip C2 are provided at a distal end of the spot welding gun, and an axis with the movable welding tip C2 at a distal end thereof is driven by a servomotor M1 through a transmission mechanism such as a ball screw/nut. The movable welding tip C2 is moved by driving the servomotor M1 to vary a gap between the tips C1 and C2 so that an object of welding (vehicle body etc.) is clamped with pressure between the tips C1 and C2, and then spot welding is performed on the object by flowing an electric current between the tips.

In a dual axis type servo gun shown in FIG. 5b, on the other hand, both of welding tips C3 and C4 are movable and respectively driven by servomotors M2 and M3 through transmission mechanisms to vary a gap between the welding tips C3 and C4, so that an object of welding is clamped with pressure to perform the spot welding.

Each of the servomotors M1 to M3 of the above-described servo gun is controlled by a robot controller for controlling a robot with a wrist to which the servo gun is attached.

When the spot welding is performed with an objet of welding clamped with pressure between the welding tips, the welding tips are occasionally stuck to the object. In such cases, if the robot operates to move the servo gun regardless of the sticking, the servo gun moves with the object stuck thereto, possibly causing deformation of the object and a consequent secondary accident.

Conventionally, therefore, a welding machine is provided with a sticking detector for detecting sticking of the welding tips to an object of welding, and a sticking detection signal is supplied to the robot controller from the sticking detector to bring the robot to an emergency stop.

However, additional provision of the sticking detector on the welding machine leads to an increase in manufacturing cost of the system as well as in maintenance cost thereof. Further, there is known a robot with a collision detection function in which a disturbance load exerted on individual axes of the robot is detected by a disturbance estimating observer and it is judged that the robot arm or other component has collided with an obstacle when an abnormal load is detected. If this collision detection function is applied to the servo gun axis, since the servo gun axis is for clamping an object of welding between the welding tips with a predetermined pressure, the applied pressure is detected as a disturbance by the observer to output an abnormal load detection signal although the operation is normal. Therefore, this collision detection function can not be applied to the servo gun axis.

In the case where sticking of the welding tips to an object of welding is detected by the above-described collision detection function provided on the robot axes, a large estimated disturbance load is detected by the observer at an instant when the robot starts to move to the next welding point after the occurrence of such sticking. Prior to the movement of the robot, however, the welding tips of the welding gun are moved apart from each other, giving rise to a problem that the object of welding is deformed due to the opening motion of the gun. Further, if the object of welding is very soft, the disturbance load detected by the observer does not immediately increase even when the robot moves, and an abnormal load is detected only after the robot has made a large motion.

SUMMARY OF INVENTION

The object of the present invention is to provide a method of and apparatus for detecting an abnormal load on a servo gun axis, capable of quickly detecting sticking of welding tips to an object of welding, etc. without adversely affecting the object.

In an abnormal load detection method according to one aspect of the present invention, the load exerted on a servomotor for driving a servo gun axis is estimated by a disturbance estimating observer, it is determined whether or not the estimated value of the disturbance load acting in a direction of resisting an opening motion of the welding tips exceeds a reference value, and occurrence of the abnormal load by sticking of the welding tips to a workpiece is detected when it is determined that the estimated value exceeds the reference value.

In an abnormal load detection method according to another aspect of the present invention, it is determined whether or not the estimated value of the disturbance load estimated by the disturbance estimating observer deviates from a predetermined range during a period excluding a period from a start of closing motion of the welding tips until the estimated value becomes smaller than a set value, and occurrence of the abnormal load is detected when it is determined that the estimated value of the disturbance load deviates the predetermined range. With this method, an abnormal load on the servo gun axis caused by sticking of the welding tips to a workpiece as well as other types of abnormality is detected.

The present invention also provides an apparatus for carrying out the aforementioned abnormal load detection method.

DETAILED DESCRIPTION OF THE INVENTION

Figure 2:
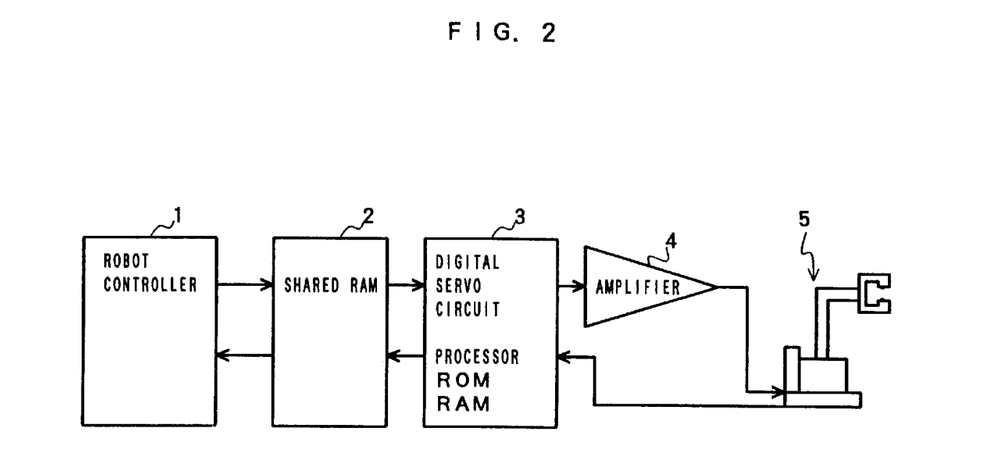
FIG. 2 is a block diagram showing a hardware constitution of the embodiment.

FIG. 2 is a block diagram showing a hardware configuration of a robot control system for carrying out the present invention. Reference numeral 1 denotes a robot controller for controlling a robot, and a processor of the robot controller 1 outputs, via a shared RAM 2, move commands and other various command signals to a digital servo circuit 3 which controls servomotors for driving individual axes of the robot and a servo gun axis. The digital servo circuit 3, which comprises a processor, memories such as ROM and RAM, an input/output interface, etc., receives the move commands for the individual axes from the robot controller 1 via the shared RAM 2, and performs a position loop process and a velocity loop process in accordance with the move commands and position and velocity feedback signals from position and velocity detectors mounted on the servomotors for driving the individual axes of a robot body 5 and the servo gun axis of a servo welding gun. Further, the digital servo circuit 3 performs a current loop process to obtain current commands for individual phases of the servomotors and outputs the current commands to respective servo amplifiers 4 each comprising an inverter etc., to control the operation of the individual servomotors. Also, the digital servo circuit 3 feeds the positions of the individual axes and the velocities of same, detected by the velocity detectors, back to the robot controller 1 via the shared RAM 2. Although not shown in FIG. 2, a control device for a welding machine is connected to the robot controller 1 via an interface.

The above-described configuration of the robot control system is identical with that of a conventional robot control system for performing spot welding, and differs therefrom in that a disturbance load applied to the servomotor for driving the servo gun axis of the welding gun is detected by an observer to thereby detect an abnormal load caused by sticking etc.

In the case of detecting, by means of an observer, a disturbance load applied to the servomotor for driving the servo gun axis of the welding gun provided with welding tips, pressure applied when an object of welding is clamped with pressure between the welding tips C1 and C2 or C3 and C4 is detected as a disturbance load. Thus, with a method in which a judgment that abnormal loading has occurred is simply made when an estimated disturbance load detected by the observer has become greater than or equal to a reference value, normal pressure application also is undesirably detected as abnormality. However, in cases where sticking of a welding tip to the object of welding has occurred, a load acts in a direction of resisting the opening motion of the welding gun when the servo gun axis is driven to move the welding tip C2 or the welding tips C3 and C4 apart. Accordingly, when the welding gun is opened following the welding operation, the load acting in the direction of resisting the opening motion may be detected by the observer to thereby detect the occurrence of sticking, and if the detected load is greater than or equal to a reference value, a judgment may be made that sticking has occurred.

Figure 4:
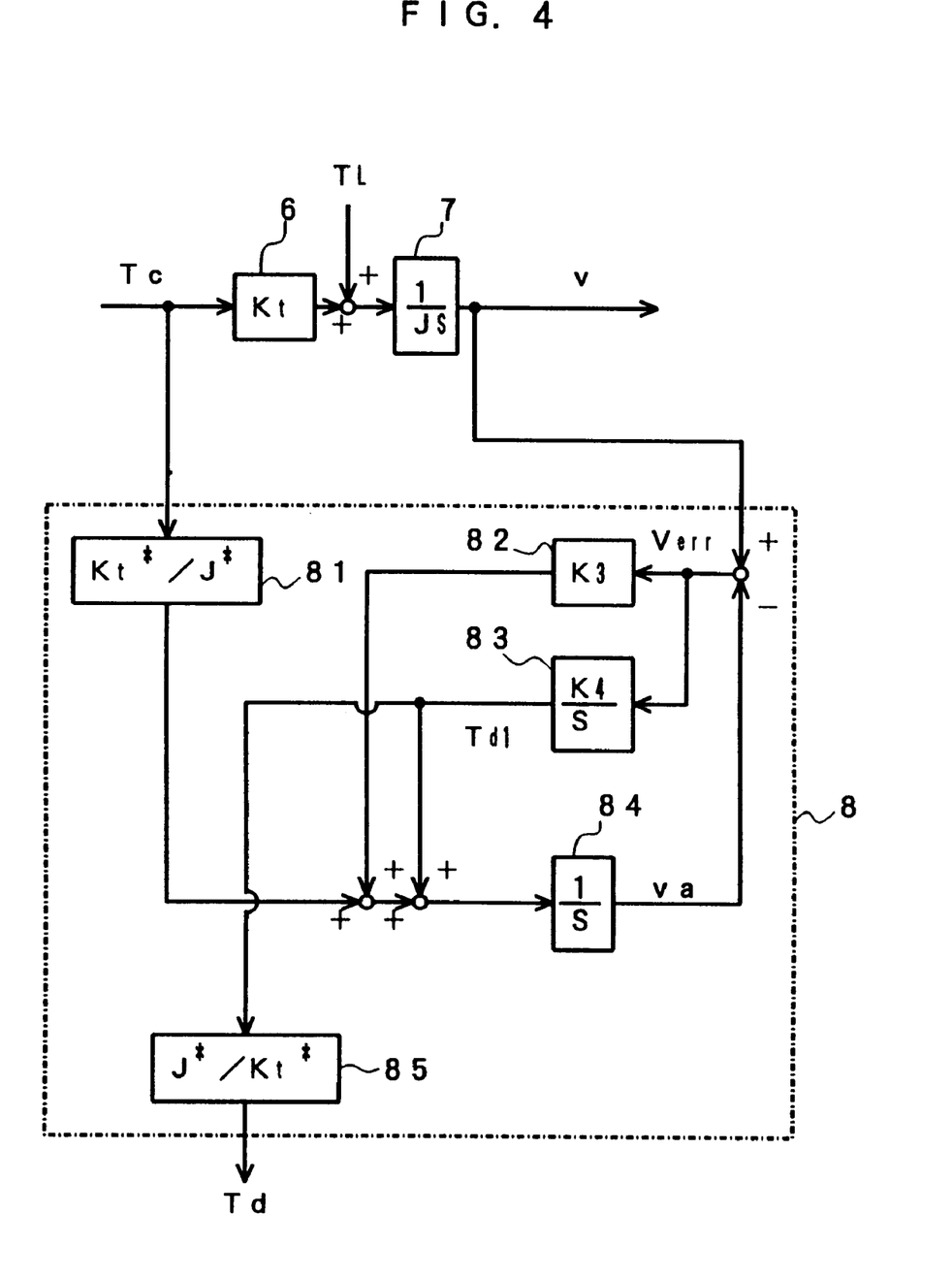
FIG. 4 is a block diagram showing an example of a disturbance estimating observer used in the embodiment.

FIG. 4 is a block diagram showing an example of a conventionally known disturbance estimating observer 8 which is applied to the servomotor for driving the servo gun axis according to this embodiment. Terms 6 and 7 are transfer functions of the servomotor (M1 or M2, M3) for driving the servo gun axis, Kt is a torque constant, J is inertia, and TL is a disturbance load.

The disturbance estimating observer 8 estimates a disturbance torque based on a torque command Tc output from the velocity loop etc., and a servomotor velocity v.

K3 and K4 in terms 82 and 83 of the disturbance estimating observer 8 are parameters of the observer, and a term 81 is a parameter value multiplied by a current value, which is the torque command Tc actually output to the servomotor, and is obtained by dividing an estimated value Kt* of the torque constant of the motor by an estimated value J* of the inertia. Reference numeral 84 denotes an integral term.

Given Kt*=Kt and J*=J, the block diagram of FIG. 4 is analyzed, then $$Td1=(TL/J)\{K4/(S^2+K3 \cdot S+K4)\}$$

In this equation, the parameters K3 and K4 are selected so that the pole may be stabilized, then the equation can be approximated to Td1=TL/J, making it possible to estimate the disturbance load TL. Then, in a term 85, Td1 is multiplied by a parameter J*/Kt* (J*: estimated value of inertia; Kt*: estimated value of torque constant), to obtain an estimated disturbance load Td (estimated disturbance load conforming to the dimension of the torque command Tc).

The estimated disturbance load Td detected by the observer is set such that when the torque command Tc takes a positive value, the disturbance load Td that the servomotor receives also takes a positive value. Namely, if movement of the welding tips toward each other to close the welding gun is attained by rotation of the servomotor M1 or M2, M3 in the positive direction, then the estimated disturbance load Td detected by the observer takes a positive value while the welding gun is closed with the servomotor M1 or M2, M3 rotated in the positive direction and an object of welding is applied with pressure. This embodiment will be explained on the assumption that the movement of the welding gun in the closing direction is attained by driving the servomotor M1 or M2, M3 in the positive direction.

Thus, while a negative torque command Tc is output to the servomotor to open the welding gun and the servomotor is rotated in the negative direction, a negative estimated disturbance load Td is detected by the observer. When the magnitude of the detected negative estimated disturbance load Td has become greater than a reference value for abnormal load detection, a conclusion may be made that sticking has occurred.

Specifically, when sticking has occurred and the welding gun is moved to open, the estimated disturbance load Td then detected by the observer shows a negative estimated load, and accordingly, a judgment that sticking has occurred may be made when a negative estimated disturbance load greater than a negative reference value set for the detection of sticking is detected by the observer.

If, however, a judgment that abnormality has occurred is made only when a negative estimated disturbance load greater than the negative reference value set for the detection of sticking is detected by the observer, a problem arises in that when another type of abnormality (e.g. abnormality in the transmission mechanism for transmitting the driving force from the servomotor to the welding tip) has occurred in the welding gun, such abnormality cannot be detected.

Therefore, in this embodiment, the detection of an abnormal load is suspended only during the period of welding operation in which the welding gun clamps an object of welding with pressure applied thereto, to prevent an abnormal load detection signal from being generated as a result of normal pressure application, and the abnormal load detection is performed during other periods of time than such pressure application (e.g. opening/closing of the welding gun for the adjustment of the gap between the welding tips) to detect sticking as well as other types of abnormality.

Figures 3A, 3B:
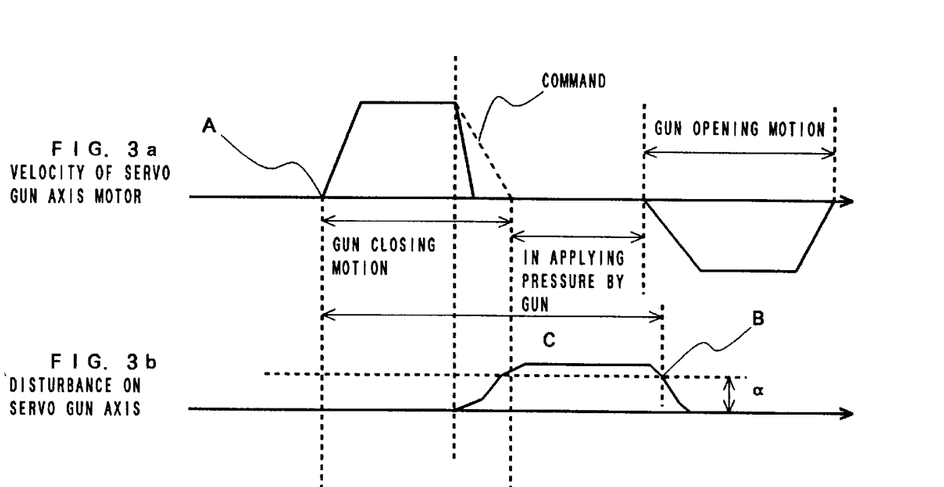
FIGS. 3A—3C are a timing chart illustrating the operation according to the embodiment.
Figure 3C:
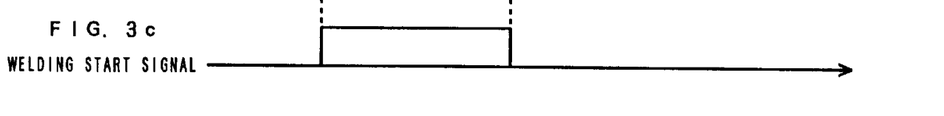

FIG. 3 is a timing chart illustrating an abnormal load detection method according to the present invention. As shown in FIG. 3a, a gun close command for the servo gun axis is output, whereupon the servomotor associated with the servo gun axis is driven in the positive direction and thus the welding tip C2 or C3, C4 moves in the closing direction. This move command instructs the welding tip to move to a position which is advanced farther in the closing direction than a position where the welding tip comes into contact with an object of welding. Accordingly, during the movement, the welding tip comes into contact with the object and tries to advance farther, with the result that the object is applied with pressure by the welding tip. The torque command for the servomotor is limited to thereby limit the output torque of the servomotor, and therefore, the limited output torque is output from the servomotor, so that the applied pressure is kept at a predetermined value. As a result, the servo gun axis stops without reaching the command position as shown in FIG. 3a, the disturbance load on the servo gun axis as estimated by the observer shows a fixed value as shown in FIG. 3b, and the predetermined pressure is maintained for a set predetermined period of time. While pressure is applied in this manner, electric current is passed between the welding tips C1 and C2 or C3 and C4 to weld the object, and after the welding is completed, an open command is output to the welding gun, so that the servomotor for driving the servo gun axis is rotated in the negative direction to move the servo gun axis in the negative direction and thereby open the welding gun, followed by movement of the welding gun to the next welding point.

As for the detection of an abnormal load, a judgment that abnormal loading has occurred is made when the disturbance load detected by the observer has become greater than a reference value set for the abnormal load detection. The reference value is set at a pressure level lower than the pressure applied during normal operation. It is therefore necessary to prevent a judgment that abnormal loading has occurred from being made based on the detection of such normal pressure by the observer.

Accordingly, in this embodiment, a welding start signal is output from the robot controller 1 simultaneously with the output of the welding gun close command, as shown in FIG. 3c, and the abnormal load detection is suspended from the generation of the signal until the disturbance load (applied pressure) estimated by the observer becomes smaller than a set value $\alpha$. Specifically, the judgment on abnormal load is not made during an interval C from a point of time A at which the welding is started to a point of time B at which the estimated disturbance load becomes smaller than the set value $\alpha$.

The value $\alpha$ is set to a value smaller than the reference value which is compared with the estimated disturbance load to make a judgment on abnormal load. The judgment on abnormal load is inhibited from being made not during the interval from the start of the welding gun closing motion to the start of the gun opening motion, but during the aforementioned interval C for the reason stated below. After welding is finished, a welding gun open command is output and a move command which has been subjected to an acceleration/deceleration process is output to the servomotor for driving the servo gun axis, whereupon the servomotor causes a retracting motion while receiving a reaction force from the object which has so far been applied with pressure. At this time, the retraction is performed while gradually reducing the torque command (current command) for the servomotor in the positive direction (closing direction), that is, with a braking force applied to the servomotor. Accordingly, if the interval during which the judgment on abnormal load is inhibited from being made is set to terminate with the start of the welding gun opening motion, then a judgment that abnormal loading has occurred can possibly be made on detection of the estimated disturbance load (applied pressure) applied during such braked retracting motion. For this reason, the judgment on abnormal load is inhibited from being made during the interval C until the estimated disturbance load becomes smaller than the set value $\alpha$ which is smaller than the reference value used for making an abnormal load judgment.

Figure 1:
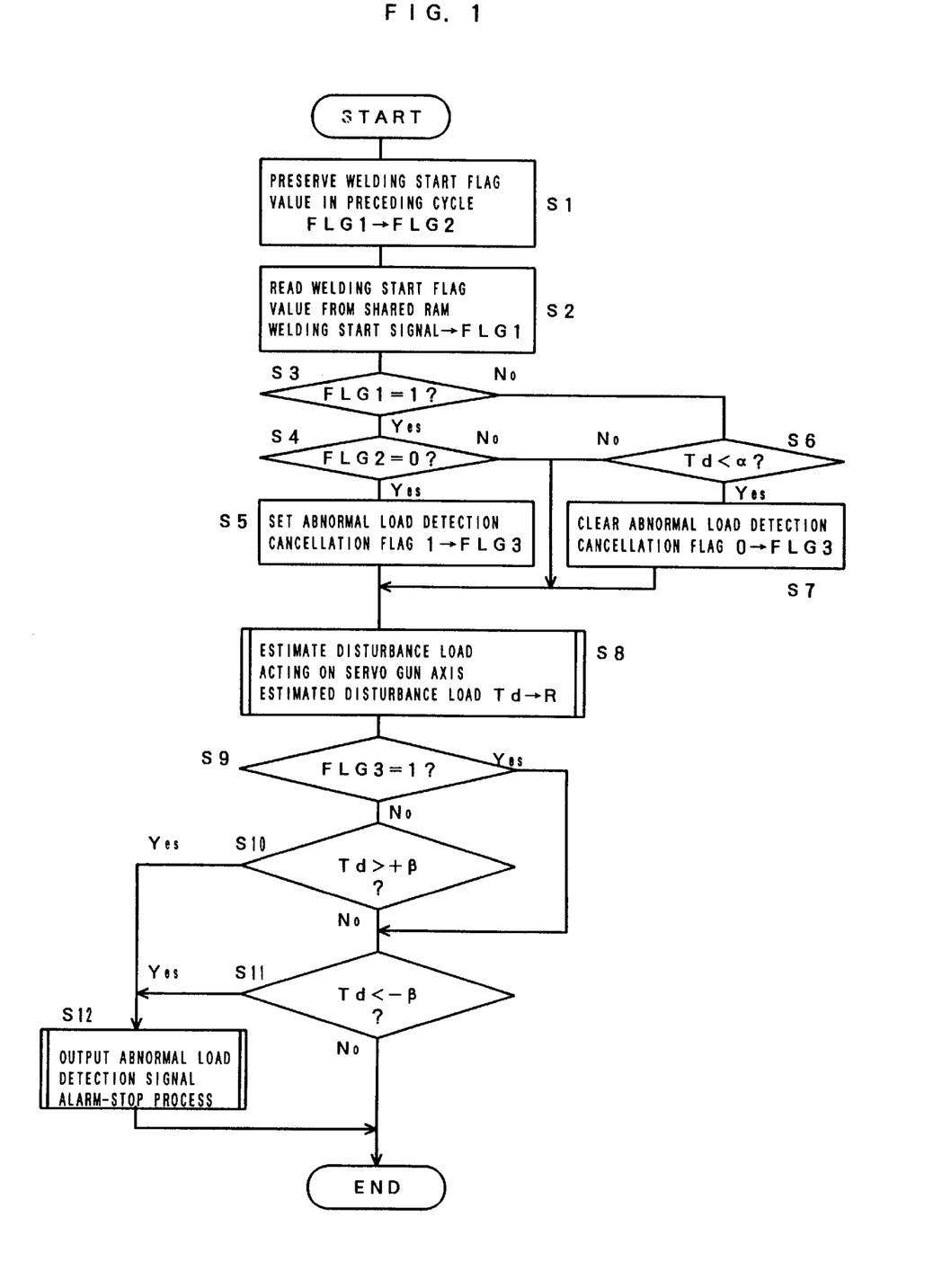
FIG. 1 is a flowchart showing an abnormal load detection process according to one embodiment of the present invention.

FIG. 1 is a flowchart showing the abnormality detection process executed by the processor of the digital servo circuit 3 at predetermined intervals of time.

The value of a flag FLG1 stored in a preceding processing cycle is loaded into a flag FLG2 (Step S1), and the value of a flag storing the welding start signal is read from the shared RAM 2 and loaded into the flag FLG1 (Step S2). It is then determined whether or not the value of the flag FLG1 is "1", that is, whether or not the welding start Signal has been output from the robot controller 1 (Step S3). At first, no welding start Signal has been output and the flag FLG1 is set at "0"; therefore, the flow proceeds to Step S6 to determine whether or not the estimated disturbance load Td obtained by the process of the observer in the preceding cycle and stored in a register R is smaller than the set value $\alpha$. Usually, the servomotor for driving the servo gun axis of the welding gun remains stopped before welding is started, and thus is applied with almost no load. Accordingly, the estimated disturbance load Td detected by the observer shows a small value and is smaller than the set value $\alpha$. If it is judged that the estimated disturbance load Td is smaller than the set value $\alpha$, a flag FLG3 for canceling the abnormal load detection is set to "0" (Step S7), and an estimated disturbance load Td acting on the servo gun axis is obtained by executing the process of the observer shown in FIG. 4 and is stored in the register R (Step S8). The process of the observer is conventionally known, and therefore, description thereof is omitted.

Subsequently, it is determined whether or not the flag FLG3 has been set to "1" (Step S9), and if the set value is not "1", a determination is made as to whether or not the disturbance load Td estimated in Step S8 is larger than a reference value $+\beta$ which is set for the detection of an abnormal load (Step S10) and also whether or not the same disturbance load is smaller than $-\beta$ (Step S11). Namely, it is determined whether or not the absolute value of the estimated disturbance load Td is larger than the reference value $\beta$. If the estimated disturbance load Td is smaller than the reference value $\beta$, the process for the present cycle is ended. The values $\alpha$ and $\beta$ satisfy a relationship of $0<\alpha<\beta$.

Steps S1 to S3 and S6 to S11 are thereafter repeatedly executed at the predetermined intervals of time, and when the servomotor for driving the servo gun axis is operated to adjust the gap between the welding tips C1 and C2 or between the welding tips C3 and C4 and it is judged that the estimated disturbance load Td has become larger than the positive reference value $+\beta$ (Step S10) or has become smaller than the negative reference value $-\beta$ (Step S11), the flow proceeds to Step S12, in which an abnormal load Signal is sent to the robot controller 1 via the shared RAM 2 (Step S12). On receiving the Signal, the robot controller 1 outputs an alarm and brings the robot to an emergency stop.

If, on the other hand, no abnormality is detected, the robot is driven to move to the welding point and the robot controller 1 outputs a move command to close the welding gun as well as a welding start Signal, as shown in FIG. 3, whereupon the processor of the digital servo circuit 3 sets the flag FLG1 to "1" in Step S2, and since it is judged in the subsequent Step S3 that the value of the flag FLG1 is "1", it is determined in Step S4 whether or not the value of the flag FLG2 is "0". Since as a result of execution of Step S1, the value held by the flag FLG2 equals the value which had been stored in the flag FLG1 in the preceding cycle and thus is "0", the flow proceeds to Step S5, in which the abnormal load detection cancellation flag FLG3 is set to "1".

Then, an estimated disturbance load Td is obtained by executing the process of the observer and is stored in the register R (Step S8), and it is determined whether or not the value of the flag FLG3 is "1" (Step S9). Since the flag FLG3 has been set to "1" in Step S5, the flow proceeds from Step S9 to Step S11, to determine only whether or not the estimated disturbance load Td is smaller than the negative reference value $-\beta$, without the determination in Step S10 as to whether or not the estimated disturbance load Td is larger than the positive reference value $\beta$. Namely, since the robot operation has entered the interval C shown in FIG. 3 during which the abnormal load detection process is not performed, a judgment that abnormal loading has occurred is prevented from being made based on the pressure applied by the welding gun to the object of welding, which pressure is detected by the observer as the estimated disturbance load. During the closing motion of the welding gun, a negative value is usually not detected as the estimated disturbance load Td; therefore, it is judged in Step S11 that the estimated disturbance load Td is larger than the negative reference value $-\beta$, and the process for the present cycle is ended.

In the subsequent cycle onward, the flags FLG1 and FLG2 remain set at "1" due to the execution of Steps S1 and S2 as long as the welding start Signal is output (until the distribution of the move command to close the welding gun is completed). Accordingly, Steps S1, S2, S3 and S4 are executed, and since the value of the flag FLG2 is "1", the flow proceeds to Step S8, in which an estimated disturbance load Td is obtained by executing the process of the observer and is stored in the register, and then to Step S9, in which a determination is made as to whether or not the value of the flag FLG3 is "1". Since the value of the flag FLG3 is "1", the flow proceeds to Step S11 to determine whether or not the estimated disturbance load Td is smaller than the negative reference value $-\beta$ (usually, the former is smaller than the latter), and the process for the present cycle is ended.

When the distribution of the move command to close the welding gun is completed and the robot controller 1 stops outputting the welding start Signal, the flag FLG1 is set to "0"; therefore, Steps S1, S2 and S3 are executed and the flow proceeds from Step S3 to Step S6. Usually, during this period of time, the object of welding is applied with pressure by the welding tips as shown in FIG. 3, and accordingly, it is judged in Step S6 that the estimated disturbance load Td stored in the register R is larger than the set value $\alpha$. Therefore, the flow proceeds to Step S8, in which an estimated disturbance load Td is obtained by executing the process of the observer and is stored in the register, and after Steps S9 and S11 are executed, the process for the present cycle is ended.

Steps S1 to S3, S6, S8, S9 and S11 are thereafter repeatedly executed at the predetermined intervals of time, without determining whether or not the estimated disturbance load Td is larger than the positive reference value $+\beta$ (decision in Step S11), so that a judgment that abnormality has occurred is prevented from being made on detection of a state in which the estimated disturbance load Td becomes larger than the reference value $+\beta$ due to the application of pressure to the object of welding by the welding tips, and the processing of the individual cycles is ended.

If, while Steps S1 to S3, S6, S8, S9 and S11 are executed at the predetermined intervals of time, the welding is ended and the welding tips start to open in response to the output of a move command to open the welding gun, the load acting on the servo gun axis lessens and thus the estimated disturbance load Td decreases. If, as a result, it is judged in Step S6 that the estimated disturbance load Td has become smaller than the set value $\alpha$, the flow proceeds to Step S7 in which the abnormal load detection cancellation flag FLG3 is set to "0".

Then, an estimated disturbance load Td is obtained and stored (Step S8), and Since the flag FLG3 has been set to "0", the flow proceeds from Step S9 to Step S10, so that a determination is made as to whether or not the estimated disturbance load Td is larger than the set positive reference value $\beta$ and then whether or not the same estimated disturbance load Td is smaller than the negative reference value. If the magnitude of the disturbance load Td is smaller than that of the reference value $\beta$, the process for the present cycle is ended. Steps S1 to S3 and S6 to S11 are thereafter repeatedly executed at the predetermined intervals of time; if there is no sticking of the welding tip to the object of welding, the robot moves to the next welding point, and the above-described process is performed in response to the output of a welding start command from the robot controller 1.

If, on the other hand, the opening motion of the welding gun is started with the welding tip adhering to the object of welding, a load acts on the servo gun axis in a direction of resisting the opening motion and thus the servomotor for driving the servo gun axis is applied with the load in the negative direction. Such a load is detected as the estimated disturbance load Td by the process of the observer in Step S8 while Steps S1 to S3 and S6 to S11 are repeatedly executed at the predetermined intervals of time, and if it is judged in Step S11 that the estimated disturbance load Td has become smaller than the set negative reference value $-\beta$ (the absolute value thereof is larger than the reference value $\beta$), the flow proceeds from Step S11 to Step S12, in which an abnormal load detection Signal is output to the robot controller 1, so that the robot controller 1 outputs an alarm and stops the robot operation.

In the above embodiment, during the welding operation, that is, during the interval C shown in FIG. 3, Step S10 for determining whether or not the estimated disturbance load Td is larger than the positive reference value $+\beta$ is not executed in order to prevent a judgment that abnormal loading has occurred from being made on detection of an estimated disturbance load Td which is the pressure applied to the object of welding by the welding tips and which is larger than the reference value $+\beta$ for making an abnormal load judgment, and Step S10 is executed in intervals other than the interval C. On the other hand, whether the estimated disturbance load Td is smaller than the negative reference value $-\beta$ or not is determined at all times. During the application of such pressure, however, the estimated disturbance load Td as detected does not show a negative value, and accordingly, during the interval C, that is, while the value of the flag FLG3 is judged to be "1", the processing of individual cycles may be ended without executing Steps S10 and S11. This means that, in this case, the judgment on abnormal load is not made at all during the interval C.

Where sticking alone should be detected while other types of abnormality of the servo gun axis may not be detected, the detection of sticking may be performed only when a negative load is produced as the servomotor for driving the servo gun axis is driven in the negative direction to open the welding gun, Since the sticking is to be detected when the welding gun is opened. In such cases, Steps S8 and S11 alone may be executed at the predetermined intervals of time, and when the estimated disturbance load Td has become smaller than the negative reference value −β, Step S12 may be executed to output an alarm and stop the robot.

According to the present invention, sticking of the welding tip to an object of welding can be detected without using a sensor or the like, and therefore, neither extra peripheral equipment nor wiring therefor etc. is required, whereby the cost of the system and the maintenance cost can be reduced. Also, the sticking can be detected after welding is performed on a welding point and before the robot starts to move to the next welding point, so that the sticking can be quickly and safely detected. Further, it is possible to detect other types of abnormality than the sticking occurring in the servo gun axis for driving the welding tip of the welding gun.

What is claimed is:

1. A method of detecting an abnormal load exerted on a servo gun axis of a servo welding gun mounted on a robot and having welding tips provided on the servo gun axis driven to open and close by a servomotor, comprising:

estimating a disturbance load exerted on said servomotor by a disturbance estimating observer;

determining whether the estimated disturbance load acting in a direction of resisting an opening motion of said welding tips exceeds a reference value; and detecting the abnormal load caused by a sticking of the welding tips to a workpiece when it is determined that the estimated disturbance load exceeds the reference value.

2. A method of detecting an abnormal load exerted on a servo gun axis of a servo welding gun mounted on a robot and having welding tips provided on the servo gun axis driven to open and close by a servomotor, comprising:

estimating a disturbance load exerted on the servomotor by a disturbance estimating observer;

determining whether the estimated disturbance load deviates from a predetermined range, during a period excluding a period from a start of a closing motion of the welding tips until the estimated disturbance load becomes smaller than a set value; and detecting the abnormal load when it is determined that the estimated disturbance load deviates from the predetermined range.

3. An apparatus to detect an abnormal load exerted on a servo gun axis of a servo welding gun mounted on a robot and having welding tips provided on the servo gun axis driven to open and close by a servomotor, comprising:

a disturbance estimating observer to estimate a disturbance load exerted on said servomotor;

determining means for determining whether the estimated disturbance load acting in a direction of resisting an opening motion of said welding tip exceeds a reference value; and output means for outputting an abnormal load signal when it is determined that the estimated disturbance load exceeds the reference value.

4. An apparatus to detect an abnormal load exerted on a servo gun axis of a servo welding gun mounted on a robot and having welding tips provided on the servo gun axis driven to open and close by a servomotor, comprising:

a disturbance estimating observer to estimate a disturbance load exerted on said servomotor;

determining means for determining whether the estimated disturbance load estimated by said disturbance estimating observer deviates from a predetermined range;

means for suspending operation of said determining means during a period from a start of a closing motion of said welding tips until the estimated disturbance load becomes smaller than a set value; and means for outputting an abnormal load signal when it is determined by said determining means that the estimated disturbance load deviates from the predetermined range.

* * * * *

UNITED STATES PATENT AND TRADEMARK OFFICE
CERTIFICATE OF CORRECTION

PATENT NO.   : 6,236,011 B1                                           Page 1 of 1
DATED        : May 22, 2001
INVENTOR(S)  : Tetsuaki Kato et al.

It is certified that error appears in the above-identified patent and that said Letters Patent is hereby corrected as shown below:

<u>Title page, Item [54], Column 1, line 3,</u>
Change "SHAFT" to -- AXIS --.
Item [75] Inventors, change "Oshino-mura" to -- Minamitsuru --.
Item [73] Assignee, change "Fanau" to -- Fanuc --.
Item [57] ABSTRACT,
Line 15, change "Signal" to -- signal --.

<u>Column 6,</u>
Line 16, change "Signal" to -- signal --.
Line 18, change "Signal" to -- signal --.
Line 56, change "Signal" to -- signal --.
Line 58, change "Signal" to -- signal --.
Line 63, change "Signal" to -- signal --.

<u>Column 7,</u>
Line 29, change "Signal" to -- signal --.
Line 44, change "Signal" to -- signal --.
Line 60, change "S11" to -- S10 --.

<u>Column 8,</u>
Line 38, change "Signal" to -- signal --.
Line 66, change "Since" to -- since --.

Signed and Sealed this

Fifth Day of March, 2002

*Attest:*

JAMES E. ROGAN
*Attesting Officer*          *Director of the United States Patent and Trademark Office*